United States Patent
Sasaki et al.

(10) Patent No.: US 11,150,418 B2
(45) Date of Patent: Oct. 19, 2021

(54) OPTICAL CONNECTOR FERRULE AND OPTICAL CONNECTOR

(71) Applicants: SUMITOMO ELECTRIC INDUSTRIES, LTD., Osaka (JP); JAPAN COMMUNICATION ACCESSORIES MANUFACTURING CO., LTD., Komaki (JP)

(72) Inventors: Dai Sasaki, Osaka (JP); Takayuki Shimazu, Osaska (JP); Hajime Arao, Osaka (JP); Takuro Watanabe, Osaka (JP); Sho Yakabe, Osaka (JP); Motoyoshi Kimura, Komaki (JP); Manabu Izaki, Komaki (JP)

(73) Assignees: SUMITOMO ELECTRIC INDUSTRIES, LTD., Osaka (JP); JAPAN COMMUNICATION ACCESSORIES MANUFACTURING CO., LTD., Komaki (JP)

( * ) Notice: Subject to any disclaimer, the term of this patent is extended or adjusted under 35 U.S.C. 154(b) by 0 days.

(21) Appl. No.: 16/826,644

(22) Filed: Mar. 23, 2020

(65) Prior Publication Data

US 2020/0310044 A1 Oct. 1, 2020

(30) Foreign Application Priority Data

Mar. 27, 2019 (JP) .............................. JP2019-061610

(51) Int. Cl.
*G02B 6/38* (2006.01)
(52) U.S. Cl.
CPC ......... *G02B 6/3853* (2013.01); *G02B 6/3854* (2013.01); *G02B 6/3882* (2013.01); *G02B 6/3885* (2013.01)

(58) Field of Classification Search
CPC .. G02B 6/3853; G02B 6/3885; G02B 6/3882; G02B 6/3854; G02B 6/3883; G02B 6/3839
See application file for complete search history.

(56) References Cited

U.S. PATENT DOCUMENTS

| | | | | | |
|---|---|---|---|---|---|
| 5,241,612 | A | * | 8/1993 | Iwama | G02B 6/32 385/59 |
| 6,012,852 | A | * | 1/2000 | Kadar-Kallen | G02B 6/32 385/74 |

(Continued)

FOREIGN PATENT DOCUMENTS

| JP | 2014-521996 A | 8/2014 |
|---|---|---|
| WO | 2013/019622 A2 | 2/2013 |

*Primary Examiner* — Ryan A Lepisto
(74) *Attorney, Agent, or Firm* — Oliff PLC (57) ABSTRACT

An optical connector ferrule according to an embodiment includes an MT ferrule, and a spacer mounted on an optical end surface of the MT ferrule and having a guide hole into which a guide pin is inserted. The spacer has a contact surface that contacting the counterpart connector and a recess surrounded by the contact surface. The spacer includes a lens part exposed on a bottom surface of the recess and optically coupled to the optical end surface of the MT ferrule and a base part that retains the lens part by surrounding the lens part. The material of the lens part and the material of the base part are different from each other, and the difference between the linear expansion coefficient of the base part and the linear expansion coefficient of the MT ferrule is $0.5 \times 10^{-5}/°$ C. or less.

6 Claims, 8 Drawing Sheets

(56) References Cited

U.S. PATENT DOCUMENTS

| | | | | |
|---|---|---|---|---|
| 6,722,791 | B2* | 4/2004 | Cheng | G02B 6/3865 |
| | | | | 385/83 |
| 6,910,810 | B2* | 6/2005 | Mine | G02B 6/4246 |
| | | | | 385/31 |
| 7,510,337 | B2* | 3/2009 | Takeda | G02B 6/3861 |
| | | | | 385/65 |
| 9,405,076 | B2* | 8/2016 | Chen | G02B 6/32 |
| 9,645,318 | B2* | 5/2017 | Moriyama | G02B 6/3885 |
| 9,651,750 | B2* | 5/2017 | Moriyama | G02B 6/10 |
| 10,162,127 | B2* | 12/2018 | Bushnell | G02B 6/325 |
| 10,191,218 | B2* | 1/2019 | Wada | G02B 6/262 |
| 10,705,299 | B2* | 7/2020 | Nakama | G02B 6/32 |
| 2006/0245694 | A1* | 11/2006 | Chen | G02B 6/32 |
| | | | | 385/71 |
| 2011/0026882 | A1* | 2/2011 | Budd | G02B 6/3885 |
| | | | | 385/52 |
| 2012/0093462 | A1 | 4/2012 | Childers et al. | |
| 2013/0011100 | A1* | 1/2013 | Shiraishi | G02B 6/325 |
| | | | | 385/77 |
| 2014/0169743 | A1* | 6/2014 | Hodge | G02B 6/403 |
| | | | | 385/54 |
| 2015/0104135 | A1* | 4/2015 | Bushnell | G02B 6/325 |
| | | | | 385/79 |

\* cited by examiner

OPTICAL CONNECTOR FERRULE AND OPTICAL CONNECTOR

TECHNICAL FIELD

The present disclosure relates to an optical connector ferrule and an optical connector.

BACKGROUND

Japanese Unexamined Patent Publication No. 2014-521996 describes a lens ferrule assembly including a ferrule main body, a multi-fiber cable, and a lens plate. The multi-fiber cable is inserted from one side of the ferrule main body into the optical fiber retaining hole of the ferrule main body, and the lens plate is mounted on the opposite side of the one side of the ferrule main body. On the lens plate, a contact surface that contacts a counterpart connector and a recess surrounded by the contact surface are formed, and on the bottom surface of the recess, a plurality of lens parts optically coupled to the counterpart connector is exposed. This lens ferrule assembly achieves non-contact type spatial coupling in which the plurality of lens parts does not contact the counterpart connector when the contact surface contacts the counterpart connector by exposing the lens part on the bottom surface of the recess.

U.S. Unexamined Patent Application Publication No. 2012/0093462 describes a ferrule including a front part that is connected to a counterpart connector, a rear part that is located on the opposite side of the counterpart connector, and a middle part that connects the front part to the rear part. The front part has a rectangular shape, and on the front part, a pair of guide holes into which a positioning guide pin is inserted are opened. In the inside of the ferrule, a plurality of optical fiber retaining holes is formed, into and in which plural optical fibers are individually inserted and retained. The pair of guide holes is disposed so as to be arranged in the longitudinal direction of the front part that has a rectangular shape, and between the pair of guide holes, a recess that is recessed from the front part is formed. On the bottom surface of the recess, plural lenses are exposed, to which the plural optical fibers are individually optically coupled. This ferrule achieves non-contact type spatial coupling in which the plurality of lenses does not contact the counterpart connector when the front part contacts the counterpart connector.

SUMMARY

In the above-described lens ferrule assembly, the ferrule main body and the lens plate are separate components. Typically, the ferrule main body is made of a resin filled with a glass filler, and the lens plate is made of an optical resin. Since the optical resin is not filled with a glass filler or the like, the linear expansion coefficient of the optical resin forming the lens plate is higher than the linear expansion coefficient of the ferrule main body. Thus, the amount of thermal expansion of the lens plate in association with a temperature change is greater than the amount of thermal expansion of the ferrule main body. Therefore, when a temperature change is large, the positional displacement of the lens plate to the optical fiber retaining hole of the ferrule main body is increased. As a result, an increase in the eccentricity between the optical fiber and the lens plate leads to a concern that an optical coupling loss is increased.

On the other hand, the above-described ferrule is a one-piece component. In this ferrule, the plural optical fibers are individually inserted into and retained in the optical fiber retaining holes, and the lens parts exposed on the bottom surface of the recess are apart from the optical fiber. The optical fiber retaining hole is formed using an optical fiber hole forming pin that is a mold, and the lens part is formed from a lens piece that is a mold. The optical fiber hole forming pin and the lens piece are disposed at positions apart from each other, and it is difficult to achieve submicron positioning of the optical fiber hole forming pin and the lens piece, for example. Therefore, the eccentricity between the optical fiber and the lens part is sometimes increased, and in this case, there is a concern that the coupling loss between the optical fiber and the lens part is increased.

An object of the present disclosure is to provide an optical connector ferrule and an optical connector that can suppress a coupling loss with the eccentricity between an optical fiber and a lens part controlled.

An optical connector ferrule according to an embodiment is an optical connector ferrule that is a spatial coupling type optical connector ferrule to be spatially coupled to a counterpart connector, the optical connector ferrule including: an MT ferrule having an optical fiber retaining hole into and in which an optical fiber is inserted and retained, a first guide hole into which a guide pin for positioning is inserted, and an optical end surface through which a light beam optically coupled to the optical fiber passes; and a spacer mounted on the optical end surface of the MT ferrule, the spacer having a second guide hole into which the guide pin is inserted. The spacer has a contact surface that contacts the counterpart connector and a recess surrounded by the contact surface. The spacer includes a lens part exposed on a bottom surface of the recess, the lens part being optically coupled to the optical end surface of the MT ferrule and a base part configured to retain the lens part by surrounding the lens part. A material of the lens part and a material of the base part are different from each other, and the material of the base part and a material of the MT ferrule are the same.

An optical connector ferrule according to another embodiment is an optical connector ferrule that is a spatial coupling type optical connector ferrule to be spatially coupled to a counterpart connector, the optical connector ferrule including: an MT ferrule having an optical fiber retaining hole into and in which an optical fiber is inserted and retained, a first guide hole into which a guide pin for positioning is inserted, and an optical end surface through which a light beam optically coupled to the optical fiber passes; and a spacer mounted on the optical end surface of the MT ferrule, the spacer having a second guide hole into which the guide pin is inserted. The spacer has a contact surface that contacts the counterpart connector, and a recess surrounded by the contact surface. The spacer includes a lens part exposed on a bottom surface of the recess, the lens part being optically coupled to the optical end surface of the MT ferrule and a base part configured to retain the lens part by surrounding the lens part. A material of the lens part and a material of the base part are different from each other, and a difference between a linear expansion coefficient of the base part and a linear expansion coefficient of the MT ferrule is $0.5\times10^{-5}/°C$ or less.

An optical connector according to an embodiment includes the above-described optical connector ferrule and an optical fiber inserted into and retained in the optical fiber retaining hole of the optical connector ferrule.

According to the present disclosure, a coupling loss can be suppressed with the eccentricity between the optical fiber and the lens part controlled.

DETAILED DESCRIPTION

Description of Embodiment of the Disclosure of the Present Application

First, the content of an embodiment of the disclosure of the present application will be described by enumeration. An optical connector ferrule according to an embodiment is an optical connector ferrule that is a spatial coupling type optical connector ferrule to be spatially coupled to a counterpart connector, the optical connector ferrule including: an MT ferrule having an optical fiber retaining hole into and in which an optical fiber is inserted and retained, a first guide hole into which a guide pin for positioning is inserted, and an optical end surface through which a light beam optically coupled to the optical fiber passes; and a spacer mounted on the optical end surface of the MT ferrule, the spacer having a second guide hole into which the guide pin is inserted. The spacer has a contact surface that contacts the counterpart connector and a recess surrounded by the contact surface. The spacer includes a lens part exposed on a bottom surface of the recess, the lens part being optically coupled to the optical end surface of the MT ferrule and a base part configured to retain the lens part by surrounding the lens part. A material of the lens part and a material of the base part are different from each other, and the material of the base part and a material of the MT ferrule are the same.

The optical connector ferrule according to an embodiment includes the spacer that is mounted on the optical end surface of the MT ferrule. The spacer has the contact surface that contacts the counterpart connector and the recess surrounded by the contact surface. On the bottom surface of the recess, the lens part is exposed, which is optically coupled to the optical fiber inserted into and retained in the optical fiber retaining hole of the MT ferrule. Thus, since the lens part exposed on the bottom surface of the recess when the contact surface of the spacer contacts the counterpart connector does not contact the counterpart connector, spatial coupling to the counterpart connector is achieved. Since the recess is surrounded by the contact surface, the entry of dust to the inside of the recess can be suppressed. The spacer includes the lens part and the base part, and the lens part is retained on the base part. The material of the lens part and the material of the base part are different from each other, and the material of the base part is the same as the material of the MT ferrule. Therefore, the base part of the spacer that retains the lens part by surrounding the lens part and the MT ferrule have the same material. Thus, even though a temperature change occurs, the base part made of the same material as the material of the MT ferrule suppresses the thermal expansion of the lens part by surrounding the lens part. Therefore, the base part suppresses the eccentricity of the lens part, and thus the eccentricity of the lens part to the optical fiber inserted into the optical fiber retaining hole of the MT ferrule can be suppressed. As a result, the coupling loss between the optical fiber and the lens part can be suppressed. Moreover, in the optical connector ferrule, since the material of the base part of the spacer is the same as the material of the MT ferrule, the manufacture of the optical connector ferrule can be easily performed.

An optical connector ferrule according to another embodiment is an optical connector ferrule that is a spatial coupling type optical connector ferrule to be spatially coupled to a counterpart connector, the optical connector ferrule including: an MT ferrule having an optical fiber retaining hole into and in which an optical fiber is inserted and retained, a first guide hole into which a guide pin for positioning is inserted, and an optical end surface through which a light beam optically coupled to the optical fiber passes; and a spacer mounted on the optical end surface of the MT ferrule, the spacer having a second guide hole into which the guide pin is inserted. The spacer has a contact surface that contacts the counterpart connector, and a recess surrounded by the contact surface. The spacer includes a lens part exposed on a bottom surface of the recess, the lens part being optically coupled to the optical end surface of the MT ferrule and a base part configured to retain the lens part by surrounding the lens part. A material of the lens part and a material of the base part are different from each other, and a difference between a linear expansion coefficient of the base part and a linear expansion coefficient of the MT ferrule is $0.5 \times 10^{-5}/°$C. or less.

Similarly to the above-described optical connector ferrule, the optical connector ferrule according to another embodiment includes the spacer. On the bottom surface of the recess of the spacer, the lens part is exposed, which is optically coupled to the optical fiber inserted into and retained in the optical fiber retaining hole of the MT ferrule. Thus, spatial coupling to the counterpart connector is achieved, and since the recess is surrounded by the contact surface, the entry of dust to the inside of the recess can be suppressed. In the spacer, the material of the lens part and the material of the base part are different from each other, and the difference between the linear expansion coefficient of the base part and the linear expansion coefficient of the MT ferrule is $0.5 \times 10^{-5}/°$C. or less. Therefore, since the difference between the linear expansion coefficient of the base part and the linear expansion coefficient of the MT ferrule is $0.5 \times 10^{-5}/°$C. or less, the expansion of the base part to the MT ferrule can be suppressed, even though a temperature change occurs. Since the base part retains the lens part by surrounding the lens part, the base part can suppress the thermal expansion of the lens part by surrounding the lens part, even though a temperature change occurs. Therefore, similarly to the above-described optical connector ferrule, the eccentricity between the lens part retained by the base part with the lens part surrounded and the optical fiber inserted into and retained in the optical fiber retaining hole of the MT ferrule can be suppressed. As a result, the coupling loss between the optical fiber and the lens part can be suppressed.

An optical connector according to an embodiment includes the above-described optical connector ferrule and an optical fiber inserted into and retained in the optical fiber retaining hole of the optical connector ferrule. Therefore, the effect similar to the effect of the above-described optical connector ferrule is obtained.

The lens part and the base part may be formed in a one-piece component by two-color forming. In this case, the spacer including the lens part and the base part can be efficiently manufactured by two-color forming.

The lens part may be made of polyimide or polycarbonate. In this case, a material of high general-purpose properties can be used as the material of the lens part.

The lens part may include an anchor part in a projecting shape projecting in a direction intersecting with an optical axis of a light beam passing through the lens part or in a recessed shape recessed in the intersecting direction. In this case, the anchor part of the lens part in a projecting shape or in a recessed shape is fit into the base part. Therefore, since the positional displacement of the lens part to the base part can be suppressed by the anchor part even though a temperature change occurs, the eccentricity between the lens part and the optical fiber can be more reliably suppressed.

DETAIL OF EMBODIMENTS OF THE DISCLOSURE OF THE PRESENT APPLICATION

In the following, specific examples of an optical connector ferrule and an optical connector according to embodiments will be described with reference to the drawings. The present disclosure is not limited to the specific examples below, and is intended to include all modifications shown in claims and in the scope equivalent to claims. In the description of the drawings, the same components or corresponding components are designated with the same reference signs, and the duplicate description is appropriately omitted.

First Embodiment

Figure 1:
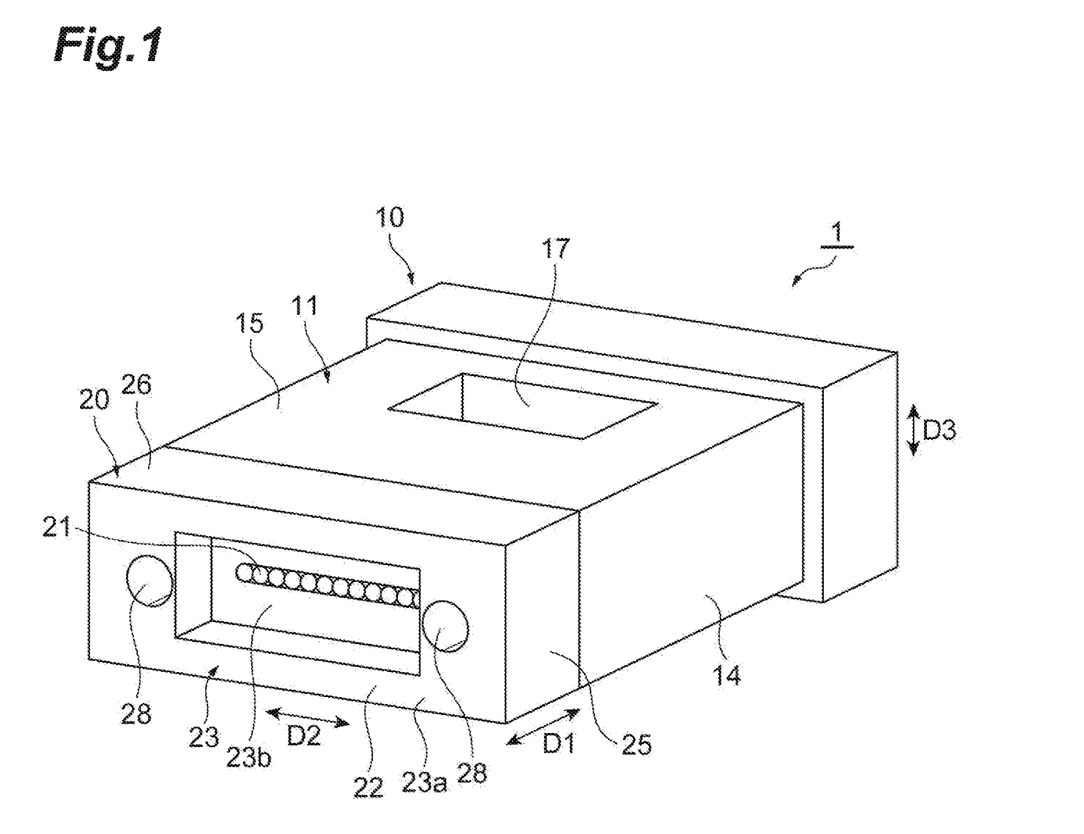
FIG. 1 is a perspective view showing an optical connector according to a first embodiment.
Figure 2:
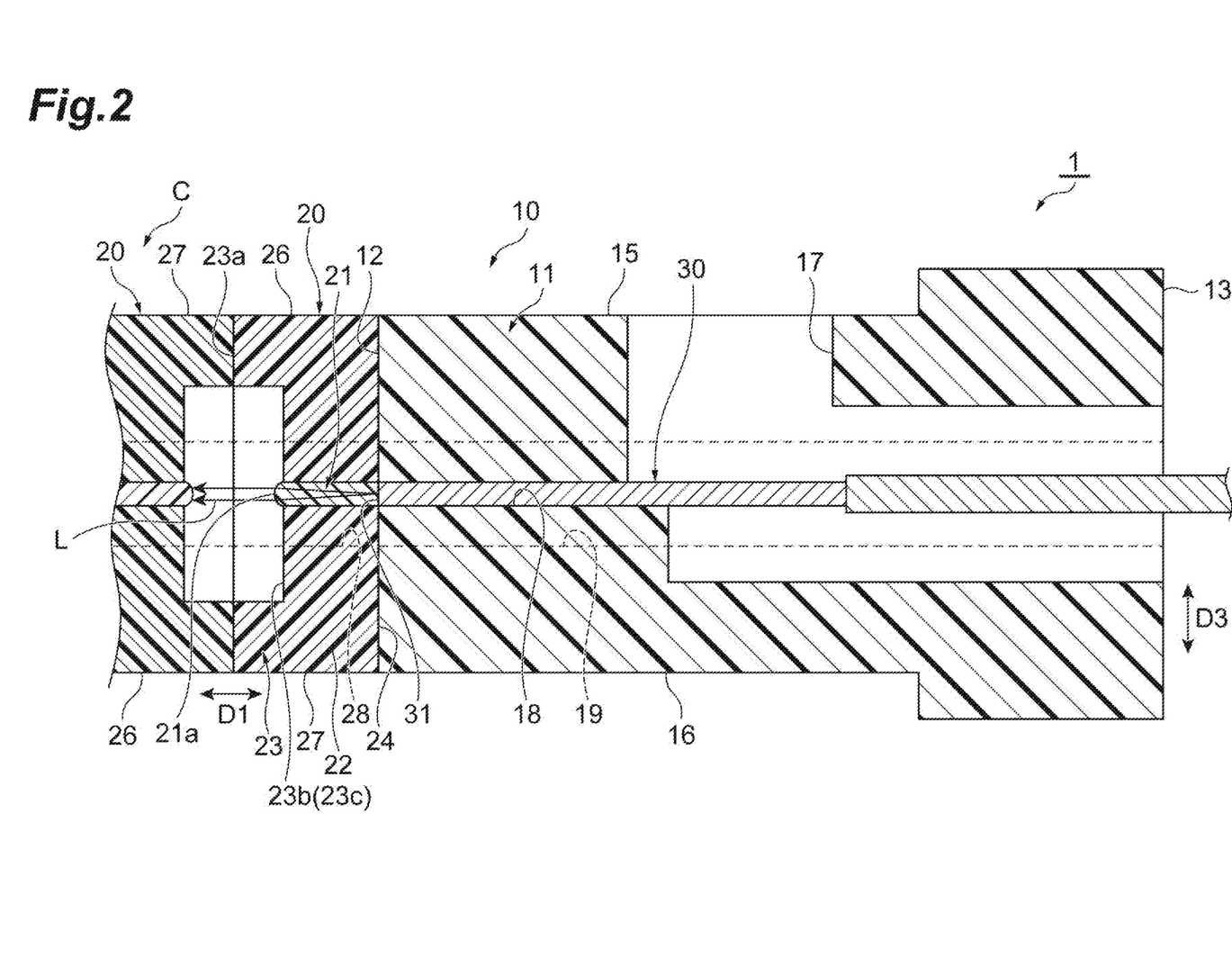
FIG. 2 is a side cross-sectional view of the optical connector in FIG. 1.

FIG. 1 is a perspective view showing an optical connector 1 according to a first embodiment. FIG. 2 is a side cross-sectional view of the optical connector 1. As shown in FIGS. 1 and 2, the optical connector 1 is connected to a counterpart connector C, for example, along a coupling direction D1. The counterpart connector C may be the same as the optical connector 1, or may be an optical connector different from the optical connector 1. The optical connector 1 includes an optical connector ferrule 10 and an optical fiber 30, and the optical connector ferrule 10 includes an MT ferrule 11 and a spacer 20. For example, the contact surface (e.g. a contact surface 23a, described later) of the optical connector 1 contacts the contact surface of the counterpart connector C. Inserting a guide pin into the guide hole (e.g. guide holes 19 and 28, described later) of the optical connector 1 and the guide hole of the counterpart connector C positions the relative position of the optical connector 1 and the counterpart connector C.

The MT ferrule 11 is configured including a glass filler in polyphenylene sulfide (PPS), for example, and the principal component of the material of the MT ferrule 11 is PPS. For example, the linear expansion coefficient of the MT ferrule 11 is about $2.0 \times 10^{-5}/°$ C. The MT ferrule 11 includes an optical end surface 12 provided at one end of a coupling direction D1 and opposed to the spacer 20, a rear end surface 13 provided at the other end of the coupling direction D1, and side surfaces 14, an upper surface 15, and an under surface 16 extending along the coupling direction D1.

A pair of side surfaces 14 is disposed arranged along a direction D2 intersecting with the coupling direction D1, and the upper surface 15 and the under surface 16 are disposed arranged along a direction D3 intersecting with both of the coupling directions D1 and the direction D2. The direction D2 is the longitudinal direction, for example, of the contact surface 23a in a rectangular shape, and the direction D3 is the width direction of the contact surface 23a. The coupling direction D1, the direction D2, and in the direction D3 are orthogonal to each other, for example.

On the upper surface 15, a window hole 17 that allows the visual recognition of the optical fiber 30 in the inside of the MT ferrule 11 is formed. The window hole 17 is the introduction hole of an adhesive that bonds and fixes the optical fiber 30 to the inside of the MT ferrule 11. Thus, the adhesive is introduced from the window hole 17 to the inside of the MT ferrule 11 in the state in which the optical fiber 30 is disposed in the inside of the MT ferrule 11, and the optical fiber 30 is bonded and fixed to the inside of the MT ferrule 11.

The MT ferrule 11 has a plurality of optical fiber retaining holes 18 in which the optical fiber 30 is retained and a guide hole 19 (a first guide hole) into which the above-described guide pin is inserted. The optical fiber retaining hole 18 and the guide hole 19 are both opened to the optical end surface 12 and the rear end surface 13 of the MT ferrule 11, and extend along the coupling direction D1 in the inside of the optical connector ferrule 10. A plurality of optical fiber retaining holes 18 and a plurality of guide holes 19 are disposed so as to be arranged along the direction D2. The MT ferrule 11 has a pair of guide holes 19, and the pair of guide holes 19 is disposed on both sides of the optical fiber retaining hole 18 in the direction D2.

On the optical end surface 12 of the MT ferrule 11, a tip end surface 31 of the optical fiber 30 is exposed. The MT ferrule 11 has the plurality of optical fiber retaining holes 18 arranged along the direction D2, and in the plural optical fiber retaining holes 18, the plural optical fibers 30 are individually inserted and retained. The optical fiber 30 is a single mode fiber, for example, having a core and a cladding. The center axis direction of each of the optical fiber retaining holes 18 and the optical axis direction of the optical fiber 30 are matched with the coupling direction D1, for example.

The spacer 20 is a resin spacer that lies between the MT ferrule 11 and the counterpart connector C. The spacer 20 has a first end part 23 that contacts the counterpart connector C, a second end part 24 that that faces the opposite side of the first end part 23 in the coupling direction D1, and a side part 25 that connects the first end part 23 and the second end part 24 to each other, an upper part 26, and a lower part 27. When the optical connector 1 and the counterpart connector C are connected to each other, the side part 25 of the optical connector 1 is flush with the side part 25 of the counterpart connector C, for example, the upper part 26 of the optical connector 1 is flush with the lower part 27 of the counterpart connector C, and the lower part 27 of the optical connector 1 is flush with the upper part 26 of the counterpart connector C. Thus, since all the parts of the spacer 20 of the optical connector 1 and a spacer 20 of the counterpart connector C are in a planar shape, the entry of dust between the spacer 20 of the optical connector 1 and the spacer 20 of the counterpart connector C can be suppressed.

The spacer 20 includes a lens part 21 that is optically coupled to the optical fiber 30 and a base part 22 that surround s and retains the lens part 21. The material of the lens part 21 and the material of the base part 22 are different from each other. The lens part 21 and the base part 22 are formed in a one-piece component by two-color forming, for example. The lens part 21 is configured of an optical resin which is transparent in the communication wavelength of a light beam L handled by the optical connector 1 and through which the light beam L that is a signal light optically coupled to the optical fiber 30 is transmitted.

For example, the transmittance of the optical resin of the lens part 21 is 80% or more and 100% or less to the light beam L whose wavelength is 1,210 nm or more and 1,650 nm or less. The material of the lens part 21 may be polyimide (PEI) or polycarbonate (PC). In the case in which the lens part 21 is made of PEI or PC, the linear expansion coefficient of the lens part 21, for example, is $5.0 \times 10^{-5}/°$ C. or more and $6.0 \times 10^{-5}/°$ C. or less.

The material of the base part 22 is the same as the material of the MT ferrule 11, for example, and may be configured in which PPS includes a glass filler. The material of the base part 22 may be different from the material of the MT ferrule 11, and the difference between the linear expansion coefficient of the base part 22 and the linear expansion coefficient of the MT ferrule 11 may be $0.5 \times 10^{-5}/°$ C. or less. As described above, since the difference between the linear expansion coefficient of the base part 22 and the linear expansion coefficient of the MT ferrule 11 is small, the base part 22 and the MT ferrule 11 are similarly thermally expanded when a temperature change occurs.

The first end part 23 of the spacer 20 has the contact surface 23a that contacts the counterpart connector C and a recess 23b surrounded by the contact surface 23a. The spacer 20 has the pair of guide holes 28 (second guide holes) that communicates with the above-described pair of guide holes 19, and the openings of the guide holes 28 are formed on the contact surface 23a. The contact surface 23a is in a rectangular shape, for example. Between the second end part 24 and the optical end surface 12 of the MT ferrule 11, an adhesive is introduced, through which the light beam L is transmitted.

For example, the adhesive is coated from the window hole 17 to the inside of the MT ferrule 11, entered between the optical end surface 12 and the second end part 24, and hardened. The adhesive fixes the MT ferrule 11, the spacer 20, and the optical fiber 30 to one another. This adhesive bond and fixes the MT ferrule 11, the spacer 20, and the optical fiber 30 to one another in the state in which the position of the guide hole 19 and the position of the guide hole 28 are matched with each other on a plane extending in the direction D2 and the direction D3, for example.

Figure 3:
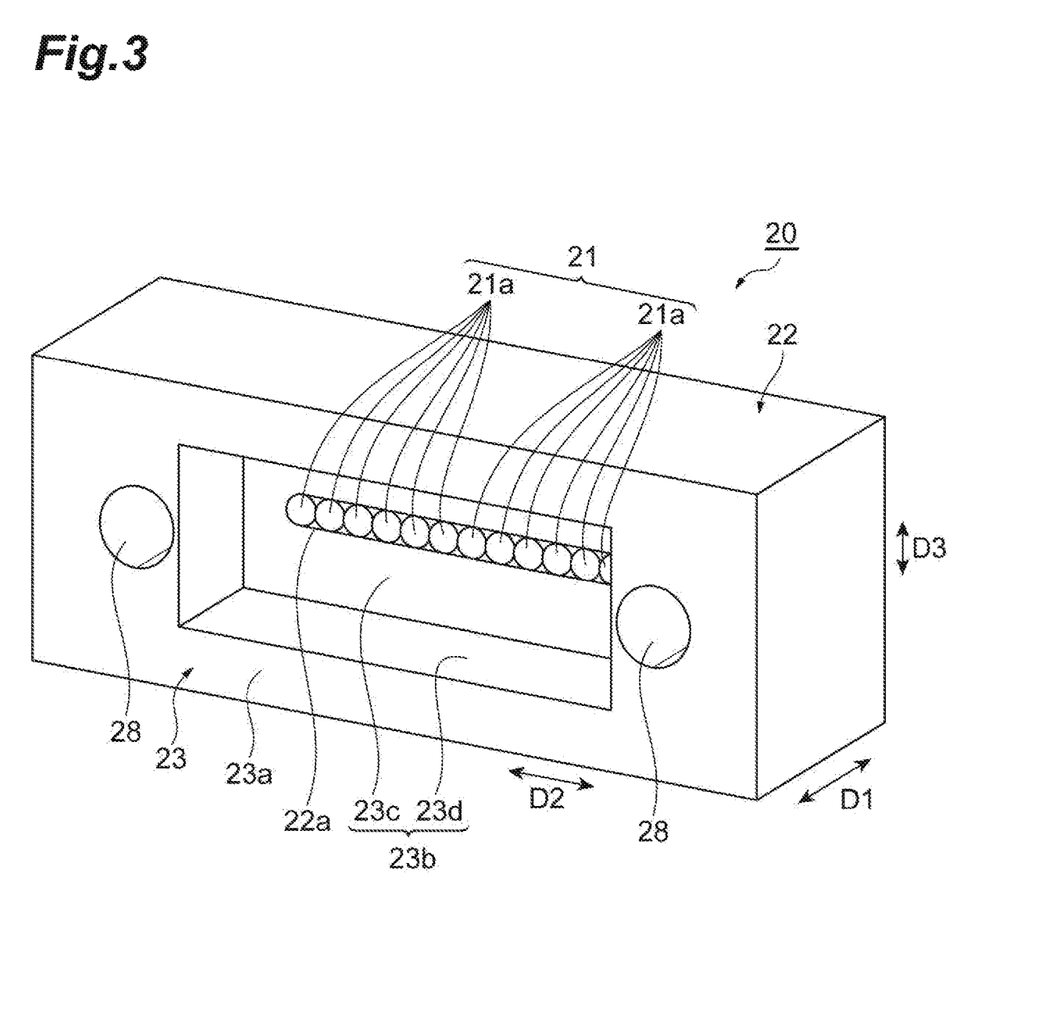
FIG. 3 is a perspective view showing the spacer of the optical connector ferrule of the optical connector in FIG. 1.
Figure 4:
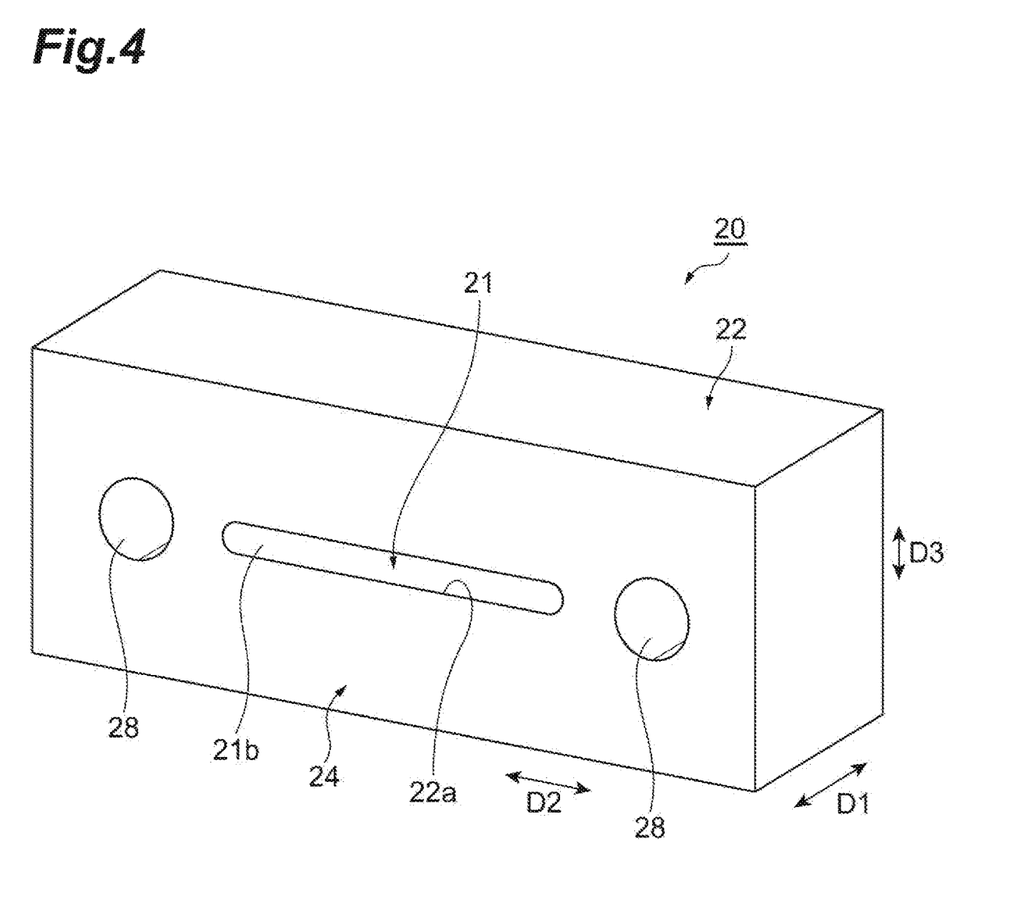
FIG. 4 is a perspective view showing the spacer in FIG. 3 viewed from a direction different from the direction in FIG. 3.

FIG. 3 is a perspective view of the spacer 20 viewed from the first end part 23 side. FIG. 4 is a perspective view of the spacer 20 viewed from the second end part 24 side. The recess 23b of the first end part 23 is defined by a bottom surface 23c from which a convex lens part 21a of the lens part 21 optically coupled to the optical fiber 30 projects and an inner side surface 23d extending from the contact surface 23a to the bottom surface 23c. The bottom surface 23c is surrounded by the contact surface 23a from four sides. The convex lens part 21a of the lens part 21 projecting from the bottom surface 23c converts the light beam L from the optical fiber 30 into a collimated light beam. The convex lens part 21a of the lens part 21 may convert a collimated light beam entered from the counterpart connector C into a light beam L that is a convergence light beam and enter the light beam L to the tip end surface 31 of the optical fiber 30.

The base part 22 has a through hole 22a that penetrates in the coupling direction D1, and the lens part 21 is inserted into the through hole 22a in the coupling direction D1. The through hole 22a has an oval shape extending in the direction D2, and has a certain height in the direction D3. The length (height) of the lens part 21 in the direction D3 is matched with the height of the through hole 22a in the direction D3, and is 0.25 mm or more and 1.00 mm or less, for example. The lens part 21 includes a lens base part 21b that is inserted into the through hole 22a, and a plurality of convex lens parts 21a that is arranged along the direction D2 is formed on the lens base part 21b. The plurality of convex lens parts 21a is exposed on the bottom surface 23c of the recess 23b of the base part 22.

For example, the number of convex lens part 21a is 12. The length from the center of the convex lens part 21a located at one end of 12 convex lens parts 21a in the direction D2 to the center of the convex lens part 21a located at the other end in the direction D2 is 2.75 mm, as an example. For example, in the case in which 12 convex lens parts 21a are disposed at regular intervals along the direction D2, the interval (the pitch) between the convex lens parts 21a disposed along the direction D2 is 0.25 mm.

The arrangement of the optical fiber retaining holes 18 of the MT ferrule 11 is the same as the above-described arrangement of the convex lens parts 21a. That is, in the case in which 12 optical fiber retaining holes 18 are disposed at regular intervals along the direction D2, the interval (the pitch) between the optical fiber retaining holes 18 disposed along the direction D2 is 0.25 mm. The length from the center axis of the optical fiber retaining hole 18 located at one end of the 12 optical fiber retaining holes 18 in the direction D2 to the center axis of the optical fiber retaining hole 18 located at the other end in the direction D2 is 2.75 mm, as an example.

Next, the operation and effect of the optical connector 1 and the optical connector ferrule 10 according to the foregoing embodiment will be described in detail. The optical connector 1 and the optical connector ferrule 10 include the spacer 20 mounted on the optical end surface 12 of the MT ferrule 11, and the spacer 20 has the contact surface 23a that contacts the counterpart connector C and the recess 23b surrounded by the contact surface 23a.

The lens part 21 optically coupled to the optical fiber 30 is exposed on the bottom surface 23c of the recess 23b, the optical fiber 30 being inserted into and retained in the optical fiber retaining holes 18 of the MT ferrule 11. Thus, since the lens part 21, which is exposed on the bottom surface 23c of the recess 23b when the contact surface 23a of the spacer 20 contacts the counterpart connector C, does not contact the counterpart connector C, spatial coupling to the counterpart connector C is achieved. Since the recess 23b is surrounded by the contact surface 23a, the entry of dust to the inside of the recess 23b can be suppressed.

The spacer 20 includes the lens part 21 and the base part 22, and the lens part 21 is retained on the base part 22. The material of the lens part 21 and the material of the base part 22 are different from each other, and the material of the base part 22 is the same as the material of the MT ferrule 11. Therefore, since the base part 22 that retains the lens part 21 by surrounding the lens part 21 and the MT ferrule 11 have the same material, the base part 22 suppresses the thermal expansion of the lens part 21 by surrounding the lens part 21, even though a temperature change occurs.

The case is assumed in which the 12 convex lens parts 21a are disposed at regular intervals, the interval (the pitch) between the convex lens part 21a is 0.25 mm, and the optical fiber retaining holes 18 of the MT ferrule 11 are similarly disposed as well, as described above. At this time, it is assumed that the temperature changes from 20° C. to 70° C. (the temperature difference is 50° C.), the thermal expansion coefficient of the MT ferrule 11 is $2.0 \times 10^{-5}/°$ C., and the thermal expansion coefficient of the lens part 21 is $5.0 \times 10^{-5}/°$ C. The amount of thermal expansion of the MT ferrule 11 is 2.75 µm, and the amount of thermal expansion of the lens part 21 is 6.88 µm.

Here, in the case in which it is assumed that the material of the base part is the same as the material of the lens part 21, an eccentricity of about 2 µm (=(6.88−2.75)/2) is produced between the convex lens part 21a at the end part in the direction D2 and the optical fiber retaining hole 18, and this causes an increase in the coupling loss between the optical fiber 30 inserted into the optical fiber retaining hole 18 and the convex lens part 21a. For example, in the case in which an eccentricity of 2 µm is produced, a coupling loss of about 0.8 dB is possibly produced.

To this, in the spacer 20 according to the present embodiment, the base part 22 and the MT ferrule 11 are configured of the same material, and the base part 22 is to suppress the thermal expansion of the lens part 21 by surrounding the lens part 21. Thus, the base part 22 suppresses the eccentricity of the lens part 21, so that the eccentricity of the lens part 21 to the optical fiber 30 inserted into the optical fiber retaining hole 18 of the MT ferrule 11 can be suppressed. Therefore, the coupling loss of the optical fiber 30 to the lens part 21 can be suppressed. Moreover, in the optical connector ferrule 10, since the material of the base part 22 of the spacer 20 is the same as the material of the MT ferrule 11, the manufacture of the optical connector ferrule 10 can be easily performed.

Note that the material of the base part 22 is not necessarily the same as the material of the MT ferrule 11. For example, the difference between the linear expansion coefficient of the base part 22 and the linear expansion coefficient of the MT ferrule 11 may be $0.5 \times 10^{-5}/°$ C. or less. In this case, the base part 22 suppresses the thermal expansion of the lens part 21 by surrounding the lens part 21 even though a temperature change occurs, and the eccentricity between the lens part 21 and the optical fiber 30 inserted into the optical fiber retaining hole 18 can be suppressed as similarly described above.

The lens part 21 and the base part 22 are formed in a one-piece component by two-color forming. Therefore, the spacer 20 including the lens part 21 and the base part 22 can be efficiently manufactured by two-color forming. In two-color forming, for example, the base part 22 is formed, the formed base part 22 is placed in a mold, and then a resin material that is to form the lens part 21 is poured into the mold to form the lens part 21, and thus the base part 22 and the lens part 21 are formed in a one-piece component.

The lens part 21 may be made of polyimide (PEI) or polycarbonate (PC). In this case, a material of high general-purpose properties can be used as the material of the lens part 21. Note that the material of the lens part 21 may be a material other than PEI or PC, which is a cycloolefin polymer (COP) or the like, for example.

The length (height) of the lens part 21 in the direction D3 is 0.25 mm or more and 1.00 mm or less, for example. In this case, since the height of the lens part 21 is 0.25 mm or more, the pitch of the convex lens part 21a can be easily matched with the pitch of the optical fiber 30. Since the height of the lens part 21 is 1.00 mm or less, the eccentricity of the height of the convex lens part 21a to the direction (in the direction D3) can be more reliably suppressed. Moreover, since the optical connector 1 and the optical connector ferrule 10 according to the present embodiment include the above-described spacer 20, a typical MT ferrule can be used as the MT ferrule 11.

Second Embodiment

Figure 5A:
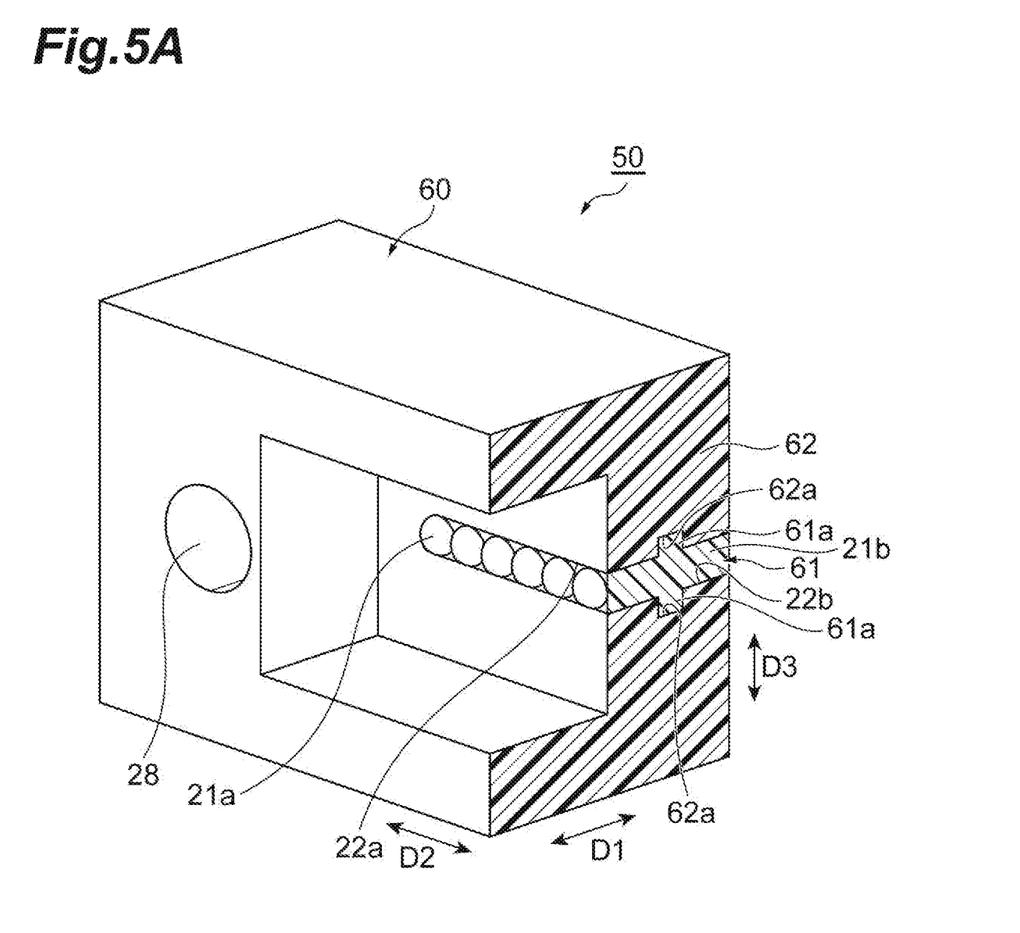
FIG. 5A is a cross-sectional perspective view showing the longitudinal section of the spacer of an optical connector ferrule according to a second embodiment.
Figure 5B:
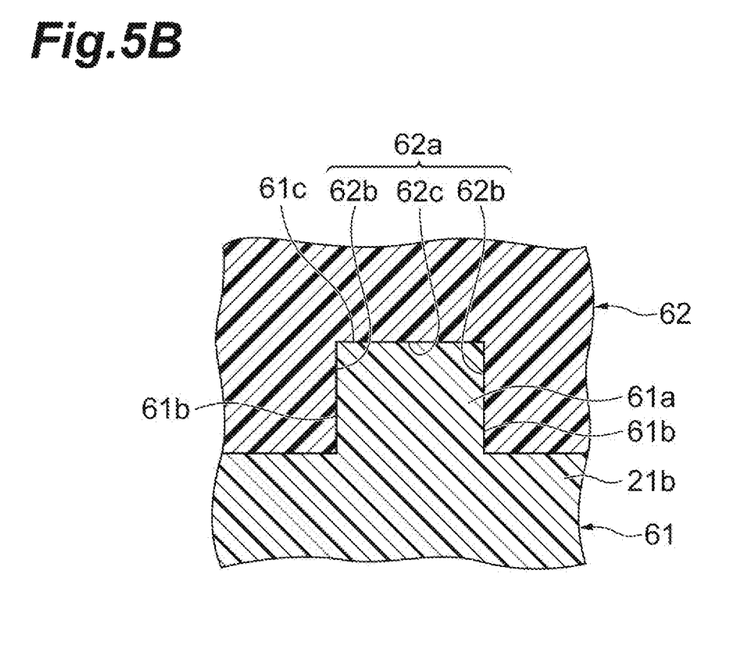
FIG. 5B is an enlarged longitudinal sectional view of the base part and the lens part of the spacer in FIG. 5A.
Figure 6:
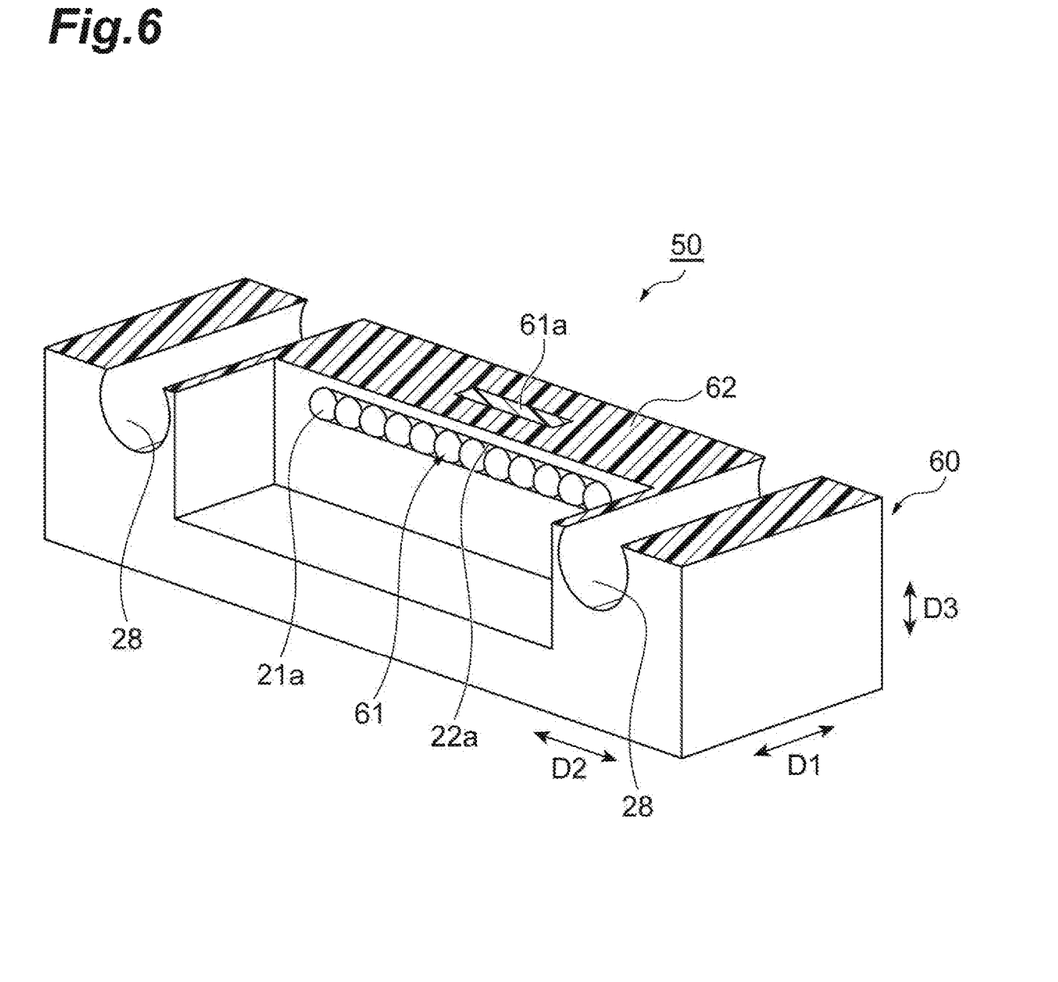
FIG. 6 is a cross-sectional perspective view showing the cross section of the spacer in FIG. 5A.
Figure 7:
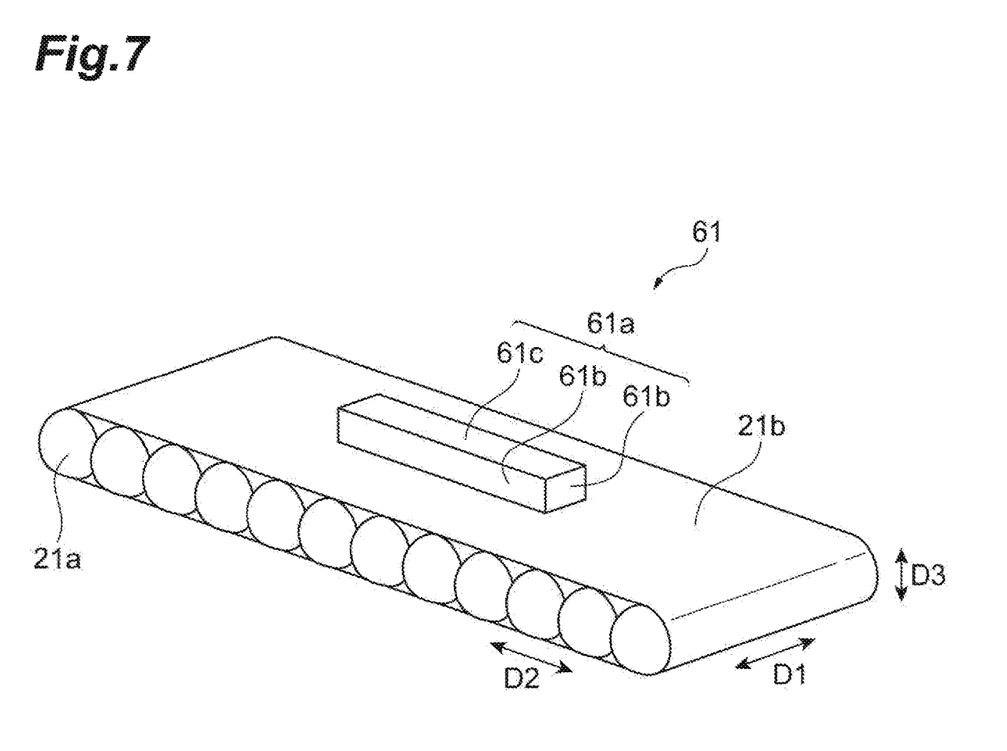
FIG. 7 is a perspective view showing the lens part of the spacer in FIG. 5A.

Next, an optical connector ferrule 50 according to the second embodiment will be described with reference to FIGS. 5A, 5B, 6, and 7. As shown in FIGS. 5A, 5B, and 6, the optical connector ferrule 50 according to the second embodiment includes a spacer 60 having a shape different from the above-described spacer 20. In the following description, in order to avoid duplication, the content the same as the content of the above-described embodiment is appropriately omitted.

As shown in FIGS. 5A, 5B, 6, and 7, the optical connector ferrule 50 includes an MT ferrule 11 and the spacer 60, and the spacer 60 includes a lens part 61 that is optically coupled to an optical fiber 30 and a base part 62 that retains the lens part 61 by surrounding the lens part 61. On an inner surface 22b of a through hole 22a of the base part 62, a recess 62a that is recessed in the direction D3 is formed. The recess 62a is recessed in a rectangular shape, for example, and defined by a plurality of inner side surfaces 62b extending from the inner surface 22b in the direction D3 and a bottom surface 62c located on the opposite side of the inner surface 22b of the inner side surface 62b. The shape of the bottom surface 62c is a rectangular shape extending long in the direction D2, for example.

The lens part 61 includes a lens base part 21b that is inserted into the through hole 22a of the base part 62 and a projection 61a projecting from the lens base part 21b. The projection 61a is an anchor part in a projecting shape that is fit into the recess 62a of the base part 62, and projects in the direction D3 intersecting with the optical axis (the coupling direction D1) of a light beam L passing through the lens part 61. The projection 61a projects in a rectangular shape, for example. The projection 61a has a plurality of side surfaces 61b extending from the lens base part 21b in the direction D3 and a top surface 61c located on the opposite side of the lens base part 21b of the side surface 61b.

Similarly to the above-described bottom surface 62c, for example, the shape of the top surface 61c is a rectangular shape extending long in the direction D2. For example, the lens part 61 may include a pair of projections 61a arranged along the direction D3. The pair of projections 61a may project in a direction apart from the lens base part 21b. As described above, in the case in which the lens part 61 includes the pair of projections 61a arranged along the direction D3, fitting of the lens part 61 into the base part 62 can be performed in an excellent balance.

As described above, in the spacer 60 of the optical connector ferrule 50 according to the second embodiment, the lens part 61 includes the anchor part (the projection 61a) in a projecting shape projecting in the direction intersecting with the optical axis of the light beam L passing through the lens part 61. The anchor part of the lens part 61 that is in a projecting shape is fit into the base part 62. Therefore, since the positional displacement of the lens part 61 to the base part 62 can be suppressed by the anchor part even though a temperature change occurs, the eccentricity between the lens part 61 and the optical fiber 30 can be more reliably suppressed. More specifically, since the lens part 61 includes the above-described anchor part, the effect of suppressing eccentricity when a temperature change occurs can be further improved, and moreover, the coining off of the lens part 61 in the coupling direction D1 can be more reliably suppressed.

Note that instead of the above-described anchor part in a projecting shape, the lens part 61 may include an anchor part in a recessed shape recessed in the direction intersecting with (e.g. in the direction D3) to the optical axis of the light beam L passing through the lens part 61. That is, the lens part 61 may include a recess recessed in the lens base part 21b, instead of the projection 61a. In this case, since the base part 62 is fit into the anchor part of the lens part 61 in a recessed shape, the positional displacement of the lens part 61 to the base part 62 can be suppressed by the anchor part even though a temperature change occurs, and thus the operation and effect similar to the description above can be obtained.

As described above, the embodiments of the optical connector ferrule and the optical connector according to the present disclosure are described. However, the present disclosure is not limited to the content of the foregoing embodiments, and can be variously modified within the scope that does not change the gist of claims. That is, the shapes, sizes, numbers, materials, and disposition forms of the components of the optical connector and the optical connector ferrule can be appropriately modified within the scope not deviating from the above-described gist.

For example, in the foregoing second embodiment, the lens part 61 is described, which includes a pair of rectangular projections 61a as the anchor part. However, the shape, size, number, and disposition form of the anchor part of the lens part can be appropriately modified, not limited to the form of the projection 61a. For example, the lens part may include a plurality of anchor parts arranged along the direction D2, or may include the anchor parts in the same number of number of convex lens parts.

In the foregoing embodiments, an example is described in which the lens part 21 and the base part 22 are formed in a one-piece component by two-color forming. However, the lens part and the base part are not necessarily formed in a one-piece component by two-color forming. For example, the lens part and the base part may be formed in a one-piece component by being mechanically fixed.

In the foregoing embodiments, the lens parts 21 and 61 are described, which include 12 convex lens parts 21a arranged along the direction D2. However, the number and disposition forms of the convex lens parts included in the lens part can be appropriately modified. For example, the lens part may be a lens part including 16 convex lens parts arranged along the direction D2. The lens part may be a lens part in which a plurality of pairs of pluralities of convex lens parts arranged along the direction D2 is arranged along the direction D3. That is, the lens part may be a lens part in which two pairs of 12 (or 16) convex lens parts arranged along the direction D2 are arranged along the direction D3. In this case, 24 (or 32) convex lens parts are arranged.

What is claimed is:

1. A spatial coupling type optical connector ferrule to be spatially coupled to a counterpart connector, the optical connector ferrule comprising:
   an MT ferrule having
      an optical fiber retaining hole into and in which an optical fiber is inserted and retained,
      a first guide hole into which a guide pin for positioning is inserted, and
      an optical end surface through which a light beam optically coupled to the optical fiber passes; and
   a spacer mounted on the optical end surface of the MT ferrule, the spacer having a second guide hole into which the guide pin is inserted, wherein
   the spacer has
      a contact surface contacting the counterpart connector and
      a recess surrounded by the contact surface,
      a lens part exposed on a bottom surface of the recess, the lens part being optically coupled to the optical end surface of the MT ferrule, and
      a base part that includes a hole that extends from the recess along a coupling direction, that retains and surrounds the lens part, and that has an oval shape,
   a material of the lens part and a material of the base part are different from each other, and
   the material of the base part and a material of the MT ferrule are the same,
   a linear expansion coefficient of the lens part is greater than a linear expansion coefficient of the MT ferrule,
   the linear expansion coefficient of the lens part is greater than a linear expansion coefficient of the base part, and
   the base part surrounds the lens part and is configured to suppress thermal expansion of the lens part.

2. The optical connector ferrule according to claim 1, wherein
   the lens part and the base part are formed in a one-piece component by two-color forming.

3. The optical connector ferrule according to claim 1, wherein
   the lens part is made of polyimide or polycarbonate.

4. The optical connector ferrule according to claim 1, wherein
   the lens part includes an anchor part in a projecting shape projecting in a direction intersecting with an optical axis of a light beam passing through the lens part or in a recessed shape recessed in the intersecting direction.

5. An optical connector comprising:
   the optical connector ferrule according to claim 1; and
   an optical fiber inserted into and retained in the optical fiber retaining hole of the optical connector ferrule.

6. A spatial coupling type optical connector ferrule to be spatially coupled to a counterpart connector, the optical connector ferrule comprising:
   an MT ferrule having
      an optical fiber retaining hole into and in which an optical fiber is inserted and retained,
      a first guide hole into which a guide pin for positioning is inserted, and
      an optical end surface through which a light beam optically coupled to the optical fiber passes; and
   a spacer mounted on the optical end surface of the MT ferrule, the spacer having a second guide hole into which the guide pin is inserted, wherein
   the spacer has
      a contact surface contacting the counterpart connector, and
      a recess surrounded by the contact surface,
      a lens part exposed on a bottom surface of the recess, the lens part being optically coupled to the optical end surface of the MT ferrule, and
      a base part that includes a hole that extends from the recess along a coupling direction, that retains and surrounds the lens part, and that has an oval shape,
   a material of the lens part and a material of the base part are different from each other,
   a difference between a linear expansion coefficient of the base part and a linear expansion coefficient of the MT ferrule is $0.5 \times 10^{-5}/°$ C. or less,
   a linear expansion coefficient of the lens part is greater than the linear expansion coefficient of the MT ferrule,
   the linear expansion coefficient of the lens part is greater than the linear expansion coefficient of the base part, and the base part surrounds the lens part is configured to suppress thermal expansion of the lens part.

* * * * *